THOMAS J. MAYALL.
Improvement in Corn-Shellers.

No. 126,067.                  Patented April 23, 1872.

Witnesses:
C. B. Nottingham
J. R. Nottingham

Inventor:
Thomas J. Mayall
by atty A. Pollok 126,067

UNITED STATES PATENT OFFICE.

THOMAS J. MAYALL, OF BOSTON, MASSACHUSETTS.

IMPROVEMENT IN CORN-SHELLERS.

Specification forming part of Letters Patent No. 126,067, dated April 23, 1872.

*To whom it may concern:*

Be it known that I, THOMAS J. MAYALL, of Boston, Suffolk county, Massachusetts, have invented certain new and useful Improvements in Corn-Shellers, of which the following is a specification:

My invention is designed to produce a cheap and efficient apparatus for shelling corn; one which is simple of construction, easily operated, and adapted to perform its work rapidly and with certainty.

The principal parts of the machine consist of feeding-rollers, cutters or strippers, and guides for directing the ear from the upper feed-rolls to the strippers. The feed-rollers are grooved to receive the ear; two pairs of feed-rollers are employed, and they are placed the one pair above and the other pair below the strippers and guides, at such distance apart that, before the ear leaves the upper pair it will be caught and drawn along by the lower pair. The openings for the passage of the ear between the rollers, as well as the openings for a like purpose between the stripping and the guide-jaws, are in the same vertical line, so that the ear will have no difficulty in passing down between the different devices by means of which the corn is finally stripped from the cob. The strippers and guides have a rotary movement in a horizontal plane, and they, as well as the feed-rollers, receive their movement from suitable gearing, as hereinafter described. The moving parts of the machine rest on a box in which the corn after having been shelled is separated from the cobs, this being effected by arranging beneath the lower rolls an inclined sieve or grating, through which the corn only will pass. The grating directs the cobs so that they will pass out from one side of the box, while the corn, after falling through, is directed by means of an inclined funnel out from the other side of the box.

Figure 1:
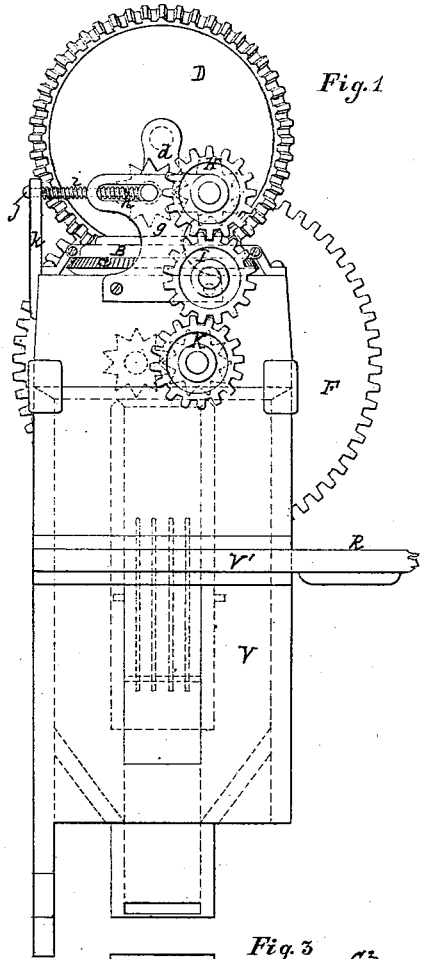
Figure 2:
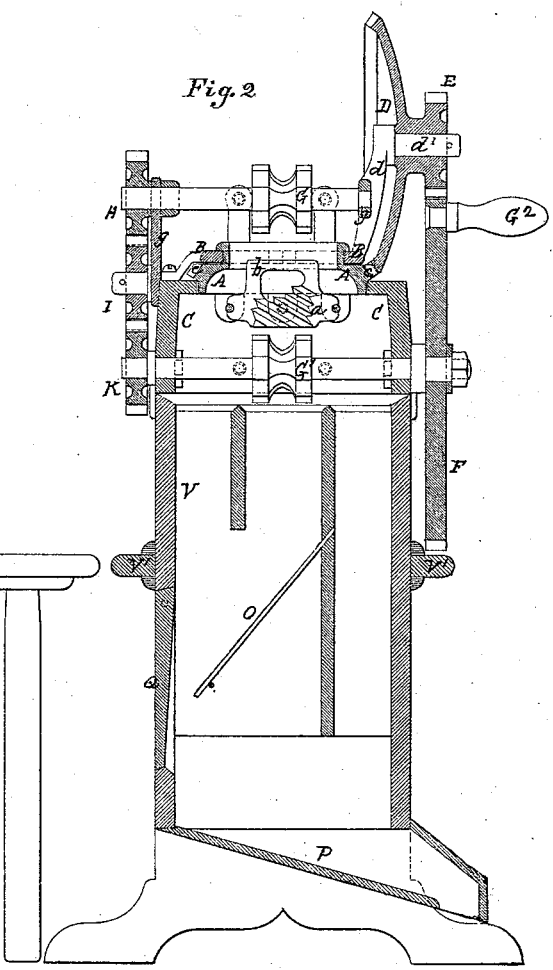
Figure 3:
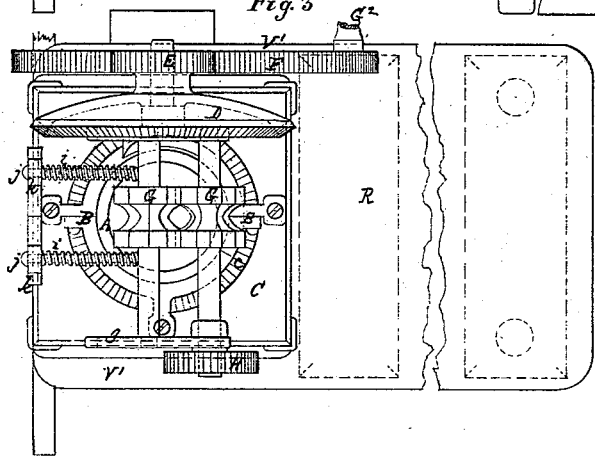

In the accompanying drawing, Figure 1 is a side elevation of a machine made in accordance with my invention. Fig. 2 is a transverse vertical central section of the same. Fig. 3 is a plan view; and Fig. 4, a like view with the top of the apparatus removed, in order to exhibit more clearly the guiding and stripping mechanism.

Figure 4:
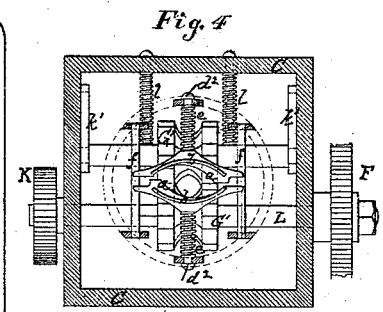

The stripping-jaws $a$ and the guides $b$ are carried by an annular flanged frame A, supported by and taking its bearing upon an encircling ring, B, made fast to the rectangular main frame C. The lower part of the frame A fits in an opening in the top of the part C, and above the top the said frame A is provided with beveled gear-teeth $c$, engaging with a large bevel-toothed wheel, D, whose hub is mounted on a suitable axis, $d^1$, carried by a standard, $d$, attached to frame C. Upon the hub of wheel D is formed a gear, E, engaging with the large driving-wheel F, provided with a crank-handle, $G^2$. By revolving the wheel F, the frame A and the strippers and guides which it carries will be caused, through the intermediary of of gearing C D E, to revolve in a horizontal plane. The guides $b$ consist of two independent upright plates or jaws placed opposite each other, and having their interior opposite faces made concave, as seen in Fig. 4, so as to receive the ear between them. Each guide-plate is independent of the other, and is, for the sake of economy and convenience, made in one piece or casting with the strippers. The strippers, like the guides, are arranged opposite to each other and independent of one another. They are composed each of an upright concave plate having slanting or spirally-arranged cutting-ridges upon their interior opposite faces, these ridges, at the upper part of the strippers, terminating in projecting teeth or points, which, when the ear passes down between the strippers bite it, and serve to begin the operation of stripping the corn from the cob. Each stripper is held in position by a pin or rod, $d^2$, attached to about the center of its exterior face, and passing through an ear projecting from the bottom of the annular revolving frame A. Between the ear and the stripper is a spiral spring, $e$, encircling the rod $d^2$. These springs serve to hold together the strippers and guides, with a yielding pressure upon the ear passing down between them. The strippers are supported and guided at each end by means of guide-rods $f$, fixed to ears on the frame A and fitting in grooves cut in the ends of the strippers, as indicated in Fig. 4.

The mechanism for feeding and drawing the ear through the guides and strippers consists of two sets of rollers, G $G^1$, the former arranged above, and the latter below the guiding and stripping devices. The upper rolls are provided with concave grooves of such size as to admit an ear between them. They are arranged so that the opening between them will come directly over the opening between the guides and strippers, and I prefer to form the surface of their concave grooves with longitudinal projections or ribs, as shown, so that they may take a firmer and surer hold on the ear. The rolls are also formed with toothed surfaces on each side of the grooves, which gear into one another, so that both rolls will move in unison. The shafts of the rolls are mounted in bearings in standard $g$, extending up from the frame C. The shaft of one of the rolls has its bearings in slots $h$, which allow this roll to have a movement toward and away from the other, to accommodate itself to different sizes of ears; and a yielding pressure between the two rolls is maintained by spiral springs $i$ encircling rods $j$, attached at one end to the shaft of the roll, and passing at the other end through uprights $k$. When the devices for maintaining a yielding pressure are thus arranged, the shaft, of course, does not revolve; the roller is loosely mounted upon it and receives its rotary movement from the other roll, which is fixed upon its shaft, and is rotated through the intermediary of the gears H I K.

The lower set of rollers $G^1 G^1$ are placed below the strippers, and their arrangement is similar to that of the upper rolls. The slotted bearings of the sliding shaft are shown at $k'$, and the pressure-springs at $l$.

The shaft L of the driving-roller is also the axis of the large main wheel F, and motion is communicated from this shaft to the driving-shaft of the upper set of rollers through the gears H I K, above named.

The construction of the lower rollers is in all respects similar to that of the upper ones, save that the opening between them is of smaller size, in order to be adapted to seize the cob after the corn has been stripped from it. The two sets of rollers are placed sufficiently near each other to insure the entrance of the cob between the lower set before it leaves the upper set, so that after it leaves the upper rollers the lower ones may still draw it along entirely through the strippers.

The whole of the above-described mechanism is mounted in and carried by the rectangular box-frame C. This frame, and, indeed, all the parts of the mechanism, including gear-wheels, strippers, guides, &c., excepting the springs, may be made of cast metal, and can be produced and fitted together cheaply and expeditiously.

The box-frame is placed upon a wooden box, V, in the interior of which, below the lower rolls $G^1$, is placed a grating or sieve, O, upon which the shelled corn and cobs fall. The corn passes through the grating and drops upon the incline P, whence it is discharged into any suitable receptacle. The cobs are directed by the grating out from the opposite side of the machine, through the pivoted or swinging door Q. In front of the machine is a bench, R, upon which the workman sits when using the machine. This bench is connected with the box V by means of arms or projecting pieces V', which fit and slide into grooves or ways formed on opposite sides of the box. Under this arrangement the machine can be taken apart and readily packed for transportation.

In operating the machine the workman straddles the bench, turns the crank $G^2$ with one hand, and with the other feeds the ears in between the upper feed-rollers.

Having described my invention, what I claim, and desire to secure by Letters Patent, is—

1. In combination with the revolving strippers, the feed-rolls, arranged above and below the strippers, and constructed with ribs and openings between each pair, as described, to enable the upper pair of rolls to take hold of the filled ear, and the lower pair to take hold of the cob after the corn has been stripped from it, as set forth.

2. In combination with the elements named in the preceding clause, the guides, arranged between the strippers and the upper pair of rolls and moving with the strippers, as herein shown and set forth.

3. The combination of the strippers and guides, the upper and lower feed-rolls, and the mechanism for operating the same, constructed and arranged for joint operation as herein shown and set forth.

4. In combination with the corn-shelling mechanism herein described, the box, constructed and arranged to separate the shelled corn from the cobs, and to discharge them through separate apertures, as herein set forth.

In testimony whereof I have signed my name to this specification before two subscribing witnesses.

THOS. J. MAYALL.

Witnesses:
EDM. F. BROWN,
C. B. NOTTINGHAM.